United States Patent
Hama et al.

(10) Patent No.: US 11,227,139 B2
(45) Date of Patent: Jan. 18, 2022

(54) APPARATUS, METHOD, AND PROGRAM FOR BIOMETRIC IMAGE PROCESSING

(71) Applicant: FUJITSU LIMITED, Kawasaki (JP)

(72) Inventors: Soichi Hama, Atsugi (JP); Yukihiro Abiko, Kawasaki (JP); Satoshi Maeda, Atsugi (JP); Satoshi Semba, Kawasaki (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 6 days.

(21) Appl. No.: 16/363,091

(22) Filed: Mar. 25, 2019

(65) Prior Publication Data

US 2019/0303649 A1 Oct. 3, 2019

(51) Int. Cl.
| | | |
|---|---|---|
| G06K 9/00 | (2006.01) | |
| G06F 21/32 | (2013.01) | |
| G06K 9/32 | (2006.01) | |

(52) U.S. Cl.
CPC ......... *G06K 9/00087* (2013.01); *G06F 21/32* (2013.01); *G06K 9/0004* (2013.01); *G06K 9/00013* (2013.01); *G06K 9/00355* (2013.01); *G06K 9/3208* (2013.01)

(58) Field of Classification Search
CPC .. G06F 21/32; G06K 9/00013; G06K 9/0004; G06K 9/00355; G06K 9/3208
See application file for complete search history.

(56) References Cited

U.S. PATENT DOCUMENTS

| | | | |
|---|---|---|---|
| 2002/0028004 A1 | 3/2002 | Miura et al. | |
| 2014/0003683 A1 | 1/2014 | Vieta et al. | |
| 2015/0248575 A1* | 9/2015 | Yamada | G06K 9/00033 382/126 |
| 2016/0275334 A1 | 9/2016 | Hama et al. | |
| 2016/0328597 A1 | 11/2016 | Abiko et al. | |
| 2017/0147151 A1* | 5/2017 | Gu | G06F 3/0418 |
| 2017/0147863 A1 | 5/2017 | Semba et al. | |
| 2017/0220841 A1 | 8/2017 | Maeda et al. | |
| 2017/0357335 A1* | 12/2017 | Carlen | G06F 3/0485 |

FOREIGN PATENT DOCUMENTS

| | | |
|---|---|---|
| JP | 2004-102993 | 4/2004 |
| JP | 2007-233981 | 9/2007 |
| JP | 2010-268989 | 12/2010 |

(Continued)

OTHER PUBLICATIONS

EESR—Extended European Search Report dated Jul. 22, 2019 issued for European Patent Application No. 19164304.8. **Reference US2017/220841A1 cited in the EESR was previously submitted in the IDS filed on Mar. 25, 2019.

(Continued)

*Primary Examiner* — Edward Park

(74) *Attorney, Agent, or Firm* — Fujitsu Patent Center

(57) ABSTRACT

A biometric-image processing apparatus includes a touch panel, a memory, an image-capturing device configured to capture an image of a living body that is in contact with the touch panel to obtain a biometric image, and a processor coupled to the memory. The processor is configured to execute a process including: calculating a distance between the image-capturing device and the living body, and calculating a rotation angle of the living body to the image-capturing device based on the distance.

12 Claims, 12 Drawing Sheets

(56) References Cited

FOREIGN PATENT DOCUMENTS

| | | |
|---|---|---|
| JP | 2016-173669 | 9/2016 |
| JP | 2016-212636 | 12/2016 |
| JP | 2017-097574 | 6/2017 |
| JP | 2017-136136 | 8/2017 |

OTHER PUBLICATIONS

EPOA—Office Action of European Patent Application No. 19164304.8 dated Mar. 4, 2020. ** All references cited in the EPOA were previously submitted in the IDS filed on Aug. 14, 2019 and Mar. 25, 2019.

* cited by examiner

FIG. 8
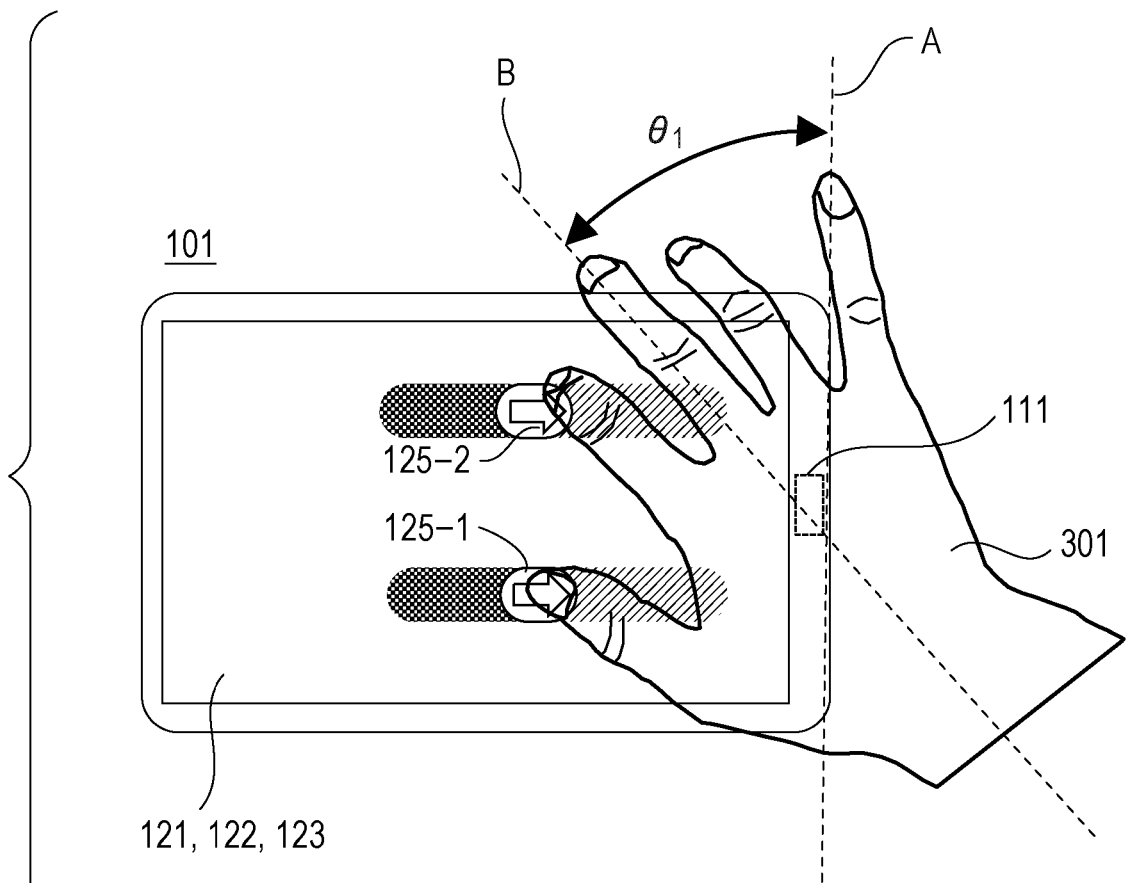
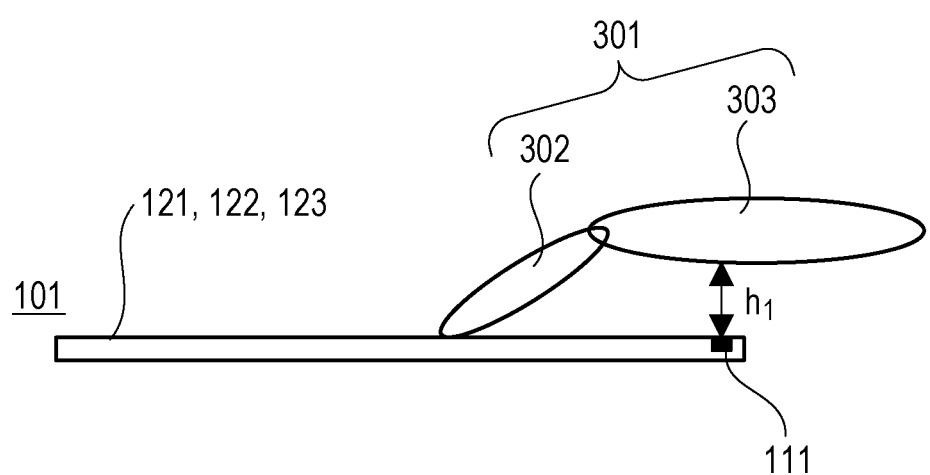

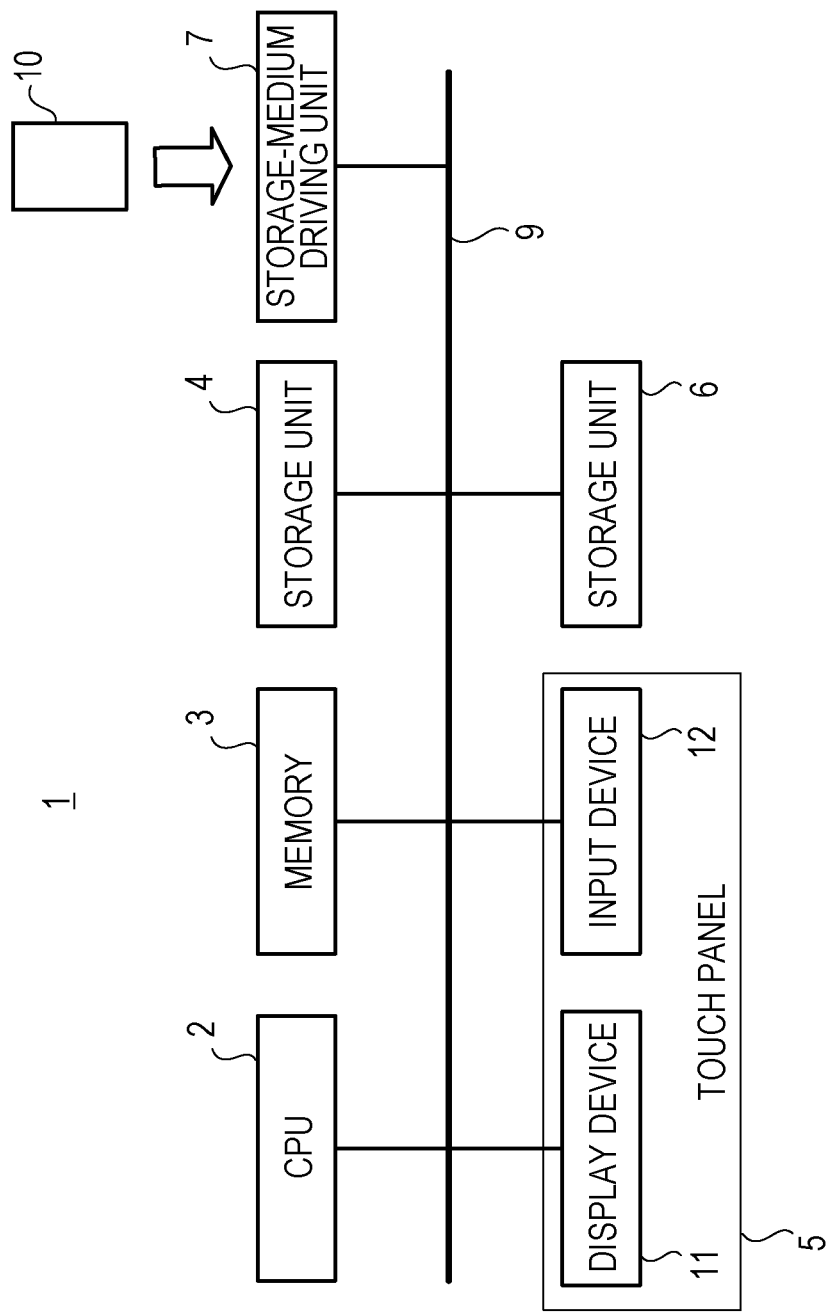

APPARATUS, METHOD, AND PROGRAM FOR BIOMETRIC IMAGE PROCESSING

CROSS-REFERENCE TO RELATED APPLICATION

This application is based upon and claims the benefit of priority of the prior Japanese Patent Application No. 2018-71161, filed on Apr. 2, 2018, the entire contents of which are incorporated herein by reference.

FIELD

The embodiments discussed herein are related to an apparatus, a method, and a program for biometric image processing.

BACKGROUND

Biometric authentication using palm veins or the like is used in broad fields, such as management of access to buildings or rooms, management of access to personal computers (PCs), and unlocking of mobile terminals such as a smartphone.

Portability of mobile terminals has improved, so that opportunities to use them in various situations such as the outdoors have increased, and convenience is strongly required for security functions. When mobile terminals are used during movement, for example, when biometric authentication is performed in an unstable usage situation in which the periphery of the user is shaking like in a passenger car, a bus, or a train, it is difficult to stabilize the mobile terminals. Degradation of input biometric information as the living body shakes at the time of input tends to cause a false rejection, which increases the operation time and the number of operations, significantly decreasing the convenience.

For example, palm vein authentication in which identification is performed by reading the vein pattern of the palm is characterized in that high security is ensured and it is easy to use in a stationary state. However, since this is used by holding the hand over the terminal without touching the sensor, the hand and the sensor tend to shake in an unstable rocking environment, so that it is difficult to use.

Many mobile terminals are used such that the touch panel or the like is operated, with the terminal held by the hand. Under the circumstance, there is a technique for fixing the relative positional relationship between the terminal and the hand to be read by reading the information on the palm at the same time the touch panel is operated by hand to reduce the influence of the rocking.

Due to size restrictions on mobile terminals, it is difficult to mount a biometric sensor with a large image-capture area, and it is also difficult to capture an image of a wide area by separating the living body from the sensor in terms of ease of use. Under the circumstance, there is a technique for capturing a plurality of images while moving the living body over the sensor.

As illustrated in FIG. 1, a mobile terminal 51 displays guide displays 61-$i$ ($i=1$, 2) indicating positions to be touched by the fingers on a touch panel 52 at the time of authentication processing. In FIG. 1, the mobile terminal 51 displays two parallel line guide displays 61-$i$ on the touch panel 52. The user moves a hand 71 while moving the thumb and the forefinger along the guide display 61-$i$ in the direction of the arrows, with the fingers in contact with the guide displays 61-$i$.

Upon detecting a touch on the guide displays 61-$i$, a biometric sensor 53, such as a camera, captures an image of an image-capture area 54 indicated by the dotted line. The biometric sensor 53 periodically captures an image of the image-capture area 54 while the fingers move along the guide displays 61-$i$ to capture a plurality of images. Thus, a plurality of images at different positions of the palm are captured. The mobile terminal 51 check features extracted from the captured images against registered data to determine whether to authenticate the user.

Thus, by displaying the lines that the user swipes with the fingers on the touch panel 52 and capturing images of the palm sliding over the touch panel 52, biometric information is efficiently input.

There is a known technique for high-speed vein authentication in application of partial authentication to vain authentication (for example, see Japanese Laid-open Patent Publication No. 2016-173669). There is another known technique for outputting an instruction for an operation position on an operating unit as an input to the operating unit is detected and capturing a biometric image after the input is detected (for example, Japanese Laid-open Patent Publication No. 2016-212636). There is a known information processing apparatus capable of palm vein authentication with a simple configuration (for example, Japanese Laid-open Patent Publication No. 2017-97574). There are other known techniques (Japanese Laid-open Patent Publication No. 2007-233981, No. 2010-268989, No. 2004-102993, and No. 2017-136136).

If the touch panel 52 is touched such that the fingers are placed on the guide displays 61-$i$, the angle of the palm can vary depending on how the hand 71 is placed. For example, as illustrated in FIGS. 2 and 3, even if the position of the touch panel 52 of the mobile terminal 51 that the finger touches is the same, the angle of the palm can vary depending on how the hand 71 is placed. The angle $\theta_2$ of the hand 71 in FIG. 3 is smaller than the angle $\theta_1$ of the hand 71 in FIG. 2.

For example, even if a biometric image is captured using the same guide display, the angle of the palm registered in registration data and the angle of the palm at the authentication can differ. The difference between the angle of the palm registered in the registration data and the angle of the palm at the authentication decreases the accuracy of authentication.

SUMMARY

According to an aspect of the embodiments, a biometric-image processing apparatus includes a touch panel, a memory, an image-capturing device configured to capture an image of a living body that is in contact with the touch panel to obtain a biometric image, and a processor coupled to the memory. The processor is configured to execute a process including: calculating a distance between the image-capturing unit and the living body, and calculating a rotation angle of the living body to the image-capturing unit based on the distance.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating the relationship between the rotation angle of the palm and the distance to the palm;

FIG. 16 is a block diagram of an information processing apparatus (computer) according to an embodiment of the present disclosure.

DESCRIPTION OF EMBODIMENTS

Embodiments of the present disclosure will be described hereinbelow with reference to the drawings.

Considering that a certain degree of rotation may occurs, a matching operation is performed while the rotation angle is being scanned. However, when the angle change is larger than assumed, a false rejection tends to occur. To cope with a significant angle change, it is preferable to perform scanning of a sufficient range of angle in a matching operation. However, as the angle range to be scanned increases, the processing time increases and the risk of false acceptance also increases. To cope with such problems, a known technique (for example, Japanese Laid-open Patent Publication No. 2004-102993) copes with the angle change by obtaining the rotation angle from the external shape information (contour) of the palm. However, in capturing an image at a very short distance such as when capturing while touching the touch panel, only a partial image of the palm is captured. This makes it difficult to estimate the angle using the contour information.

Figure 1:
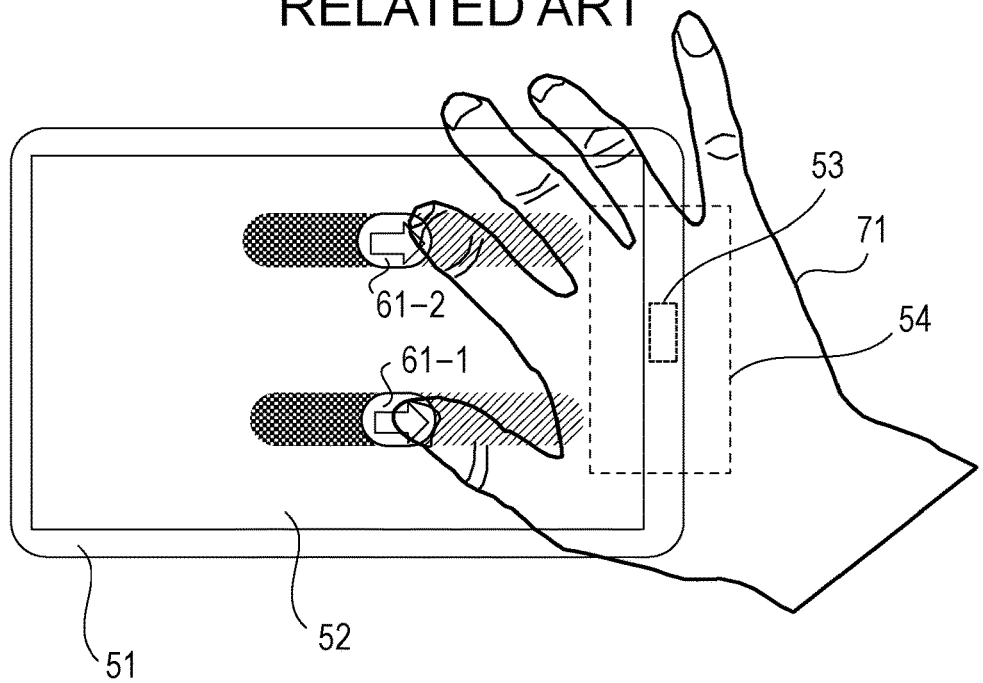
FIG. 1 is a diagram illustrating an example of the operation of a mobile terminal using a guide display in the related art.
Figure 2:
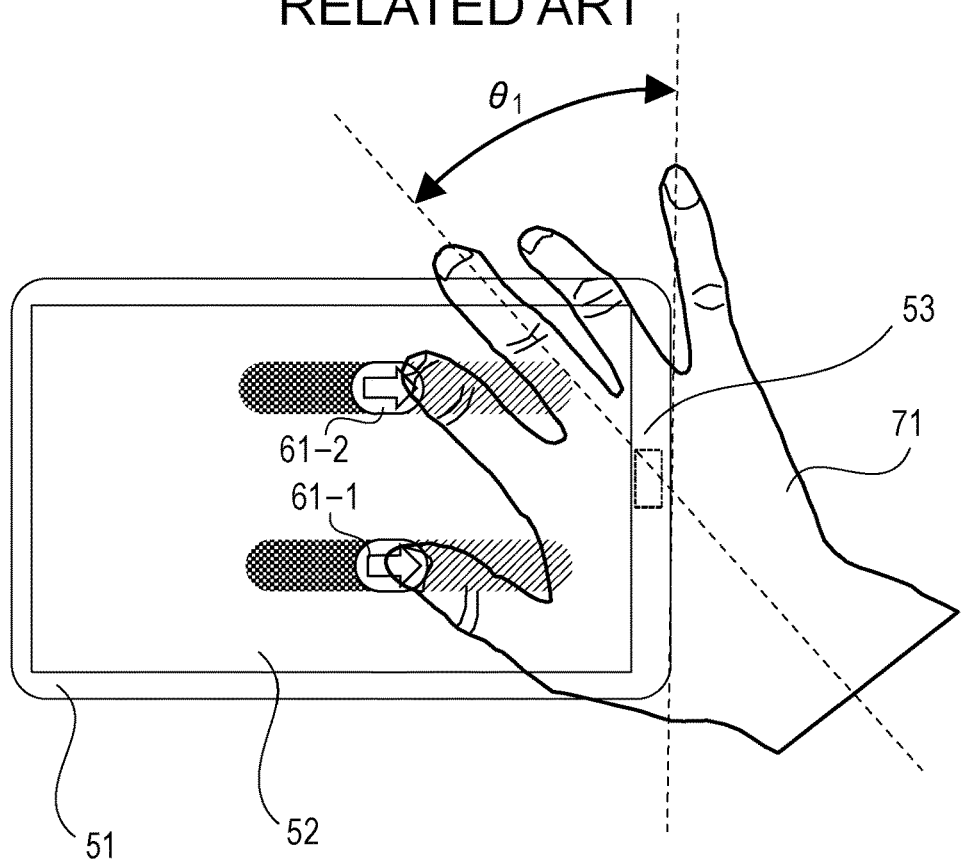
FIG. 2 is a diagram illustrating an example of the operation of a mobile terminal using a guide display in the related art.
Figure 3:
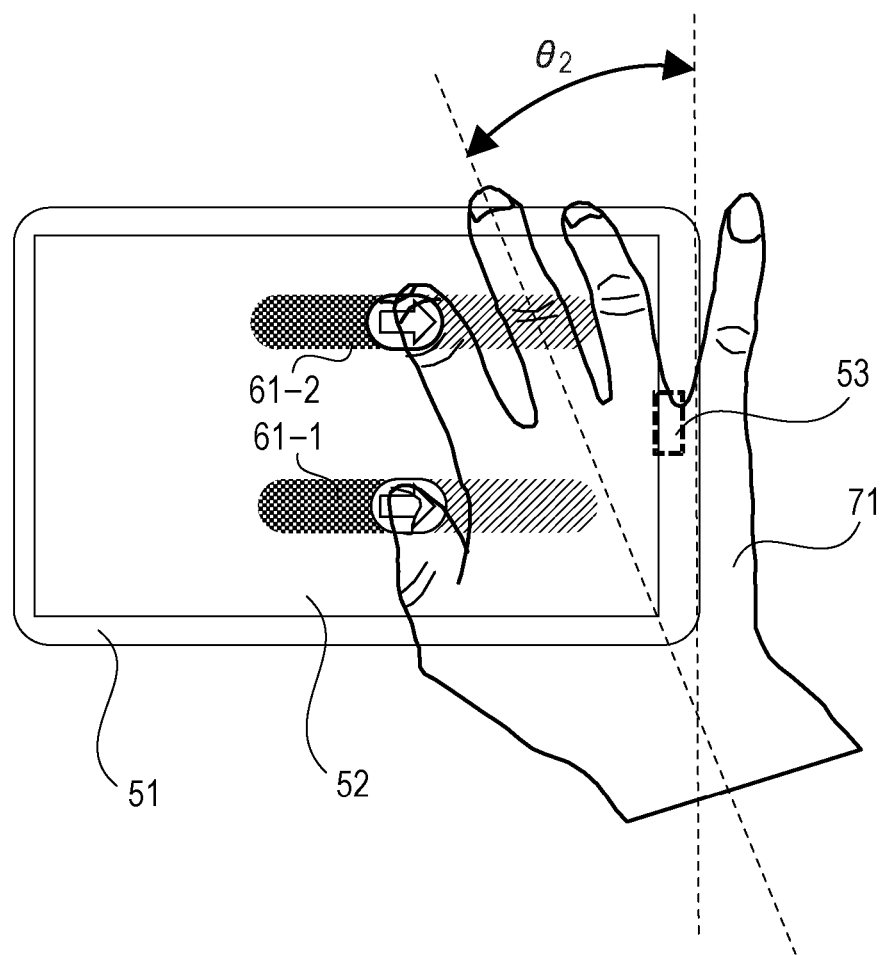
FIG. 3 is a diagram illustrating an example of the operation of a mobile terminal using a guide display in the related art.
Figure 4:
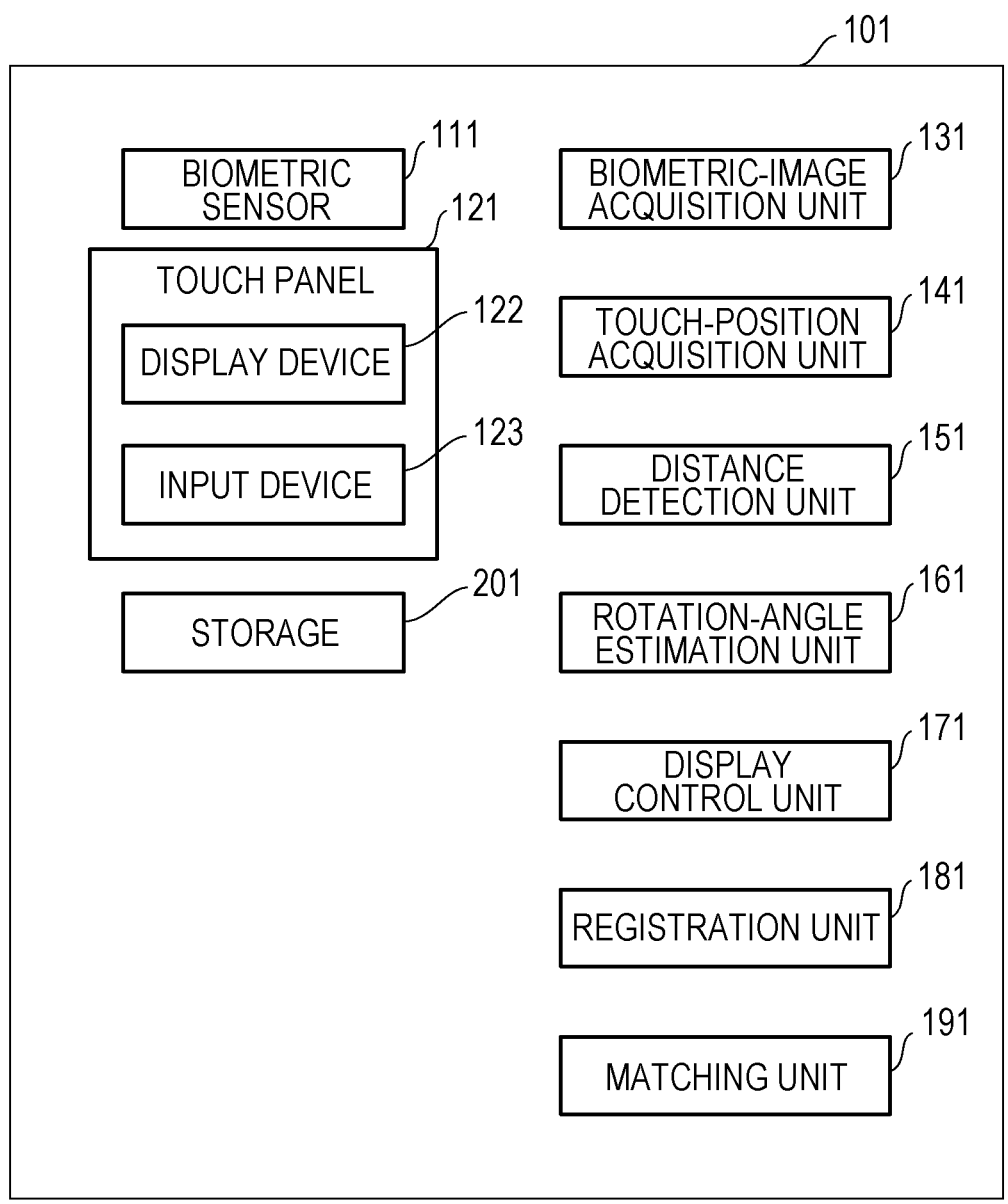
FIG. 4 is a block diagram of a terminal apparatus according to an embodiment of the present disclosure.

FIG. 4 is a block diagram of a terminal apparatus according to an embodiment of the present disclosure.

The terminal apparatus 101 includes a biometric sensor 111, a touch panel 121, a biometric-image acquisition unit 131, a touch-position acquisition unit 141, a distance detection unit 151, a rotation-angle estimation unit 161, a display control unit 171, a registration unit 181, a matching unit 191, and a storage 201. The terminal apparatus 101 is a portable information processing apparatus (a computer), such as a tablet computer or a smartphone. The terminal apparatus 101 is an example of a biometric-image processing unit.

The biometric sensor 111 captures an image of the living body, such as the palm, of a user (a registrant or an authentication target). The biometric sensor 111 is provided at a position where at least part of the palm of the user can be captured when the user operates the touch panel 121 with fingers. The biometric sensor 111 outputs the captured image of the living body (a biometric image) to the biometric-image acquisition unit 131. An example of the biometric sensor 111 is an infrared camera. The biometric sensor 111 is an example of an image-capturing unit.

The touch panel 121 has a function of displaying information and a function of detecting a touch of a finger or the like on the touch panel 121. The touch panel 121 is an input device for use in operating the terminal apparatus 101. The touch panel 121 includes a display device 122 and an input device 123.

The display device 122 displays, for example, sentences, drawings, and guide displays indicating the positions to be touched by the fingers.

The input device 123 detects the positions (the coordinates) of the positions of the fingers on the touch panel 121 (the input device 123) that the user touches and outputs the detected positions to the touch-position acquisition unit 141.

The biometric-image acquisition unit 131 receives the biometric image from the biometric sensor 111.

The touch-position acquisition unit 141 receives the positions of the user's fingers touching the touch panel 121 (the input device 123) from the input device 123.

The distance detection unit 151 detects a distance to the palm (specifically, the distance from the biometric sensor 111 to the palm). For example, the distance detection unit 151 calculates the distance from the biometric sensor 111 to the palm based on the biometric image. The distance detection unit 151 is an example of a distance calculating unit.

The rotation-angle estimation unit 161 estimates the angle (the rotation angle) of the palm to the biometric sensor 111. For example, the rotation-angle estimation unit 161 calculates the angle (the rotation angle) of the palm to the biometric sensor 111 based on the distance from the biometric sensor 111 to the palm. The rotation-angle estimation unit 161 is an example of a rotation-angle calculating unit.

The display control unit 171 displays, for example, sentences, drawings, and guide displays on the display device 122.

The registration unit 181 extracts a feature from the biometric image. The registration unit 181 may correct the biometric image based on the rotation angle obtained from the rotation-angle estimation unit 161 and may extract the feature from the corrected biometric image. An example of the feature is vein data (vein pattern) indicating the shape (pattern) of the palm veins. The registration unit 181 registers the positions of the fingers on the touch panel 121, the feature, and the rotation angle obtained from the rotation-angle estimation unit 161 when the biometric image is captured in registration database (DB) in the storage 201 in association with one another. The registration unit 181 is an example of a correction unit.

The matching unit 191 corrects (for example, rotates) the biometric image based on the rotation angle obtained from the rotation-angle estimation unit 161 and extracts a feature from the corrected biometric image. The matching unit 191 checks the feature extracted from the biometric image of the authentication target against the feature in the registration DB. If the matching is successful, the matching unit 191 authenticates the authentication target and performs predetermined processing such as unlocking of the terminal apparatus 101. The matching unit 191 is an example of the correction unit.

The storage 201 stores, for example, programs and data for use in the terminal apparatus 101. The storage 201 stores the registration DB in which the features of the registrant are stored.

Figure 5:
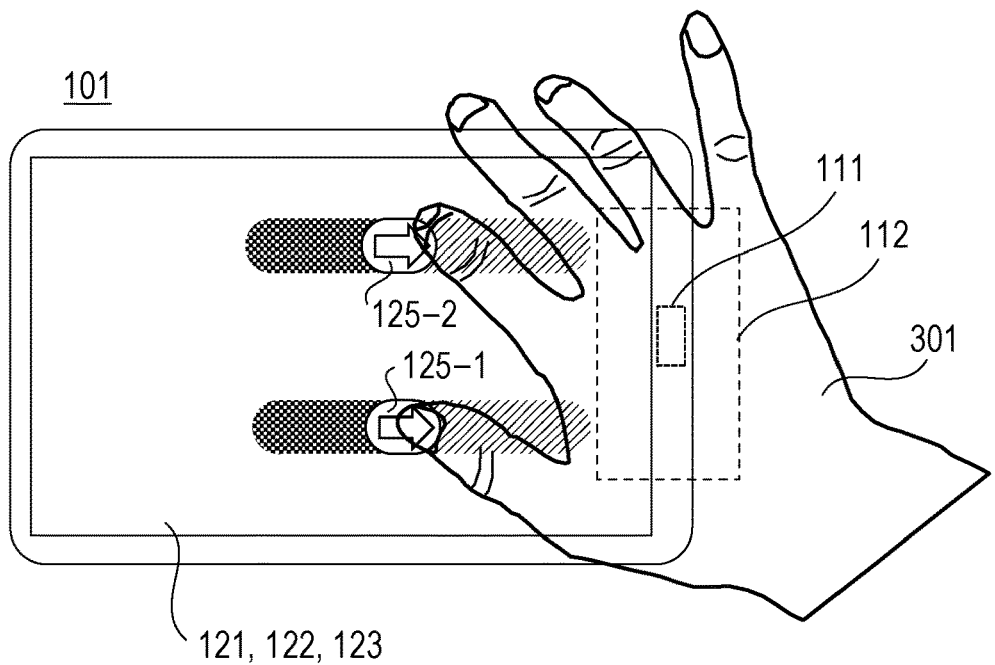
FIG. 5 is a diagram illustrating an example of the operation of the terminal apparatus using a guide display according to an embodiment of the present disclosure.

FIG. 5 is a diagram illustrating an example of the operation of the terminal apparatus 101 using the guide displays 125-*i* according to the embodiment. FIG. 5 is a plan view of the terminal apparatus 101.

The terminal apparatus 101 has a substantially rectangular shape and includes the biometric sensor 111 on one side of the periphery of the substantially rectangular touch panel 121. The biometric sensor 111 captures an image of the image-capture area 112 indicated by the dotted line.

The display control unit 171 displays two parallel lines as the guide displays 125-*i* on the display device 122 of the touch panel 121. In FIG. 5, the light hatched portions illustrate the displayed guide displays 125-*i*, and the dark hatched portions illustrate portions that the user has touched with the fingers, that is, input touched portions. The void arrows indicate the current input positions and moving directions of the fingers of the user.

In FIG. 5, two guide displays 125-*i* extend in the lateral direction. The user swipes the two guide displays 125-*i* with a thumb and a forefinger from the left end to the right at the same time, during which the biometric sensor 111 periodically captures an image of the palm of the hand 301 in the image-capture area 112.

In FIG. 5, the user swipes the two guide displays 125-*i* with the thumb and the forefinger from the left end to the vicinity of the center of the guide displays 125-*i*. Thus, the portions of the guide displays 125-*i* from the left end to the vicinity of the center are indicated by dark hatching.

The guide displays 125-*i* are given for mere illustrative purposes and are not limited thereto. The angle (rotation angle) of the palm will be described.

Figure 6:
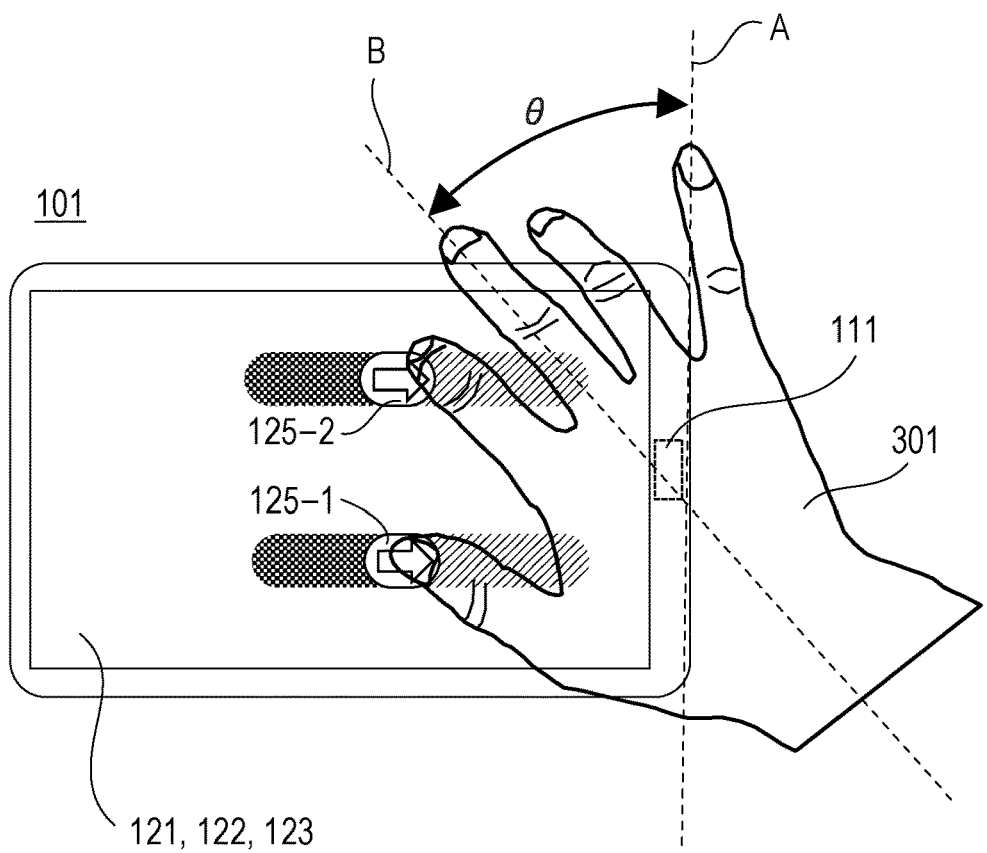
FIG. 6 is a diagram illustrating the rotation angle of the palm.

FIG. 6 is a diagram illustrating the rotation angle of the palm. In the embodiment, the rotation angle θ of the palm is an angle that a reference line A of the biometric sensor 111 and a straight line B passing through the center of the width of the middle finger of the hand 301 forms with the wrist of the user. As described above, the terminal apparatus 101 has a substantially rectangular external shape. In the embodiment, the reference line A of the biometric sensor 111 is a straight line indicating the outline of one of the four sides defining the external shape of the terminal apparatus 101, on which the biometric sensor 111 is disposed.

Figure 7:
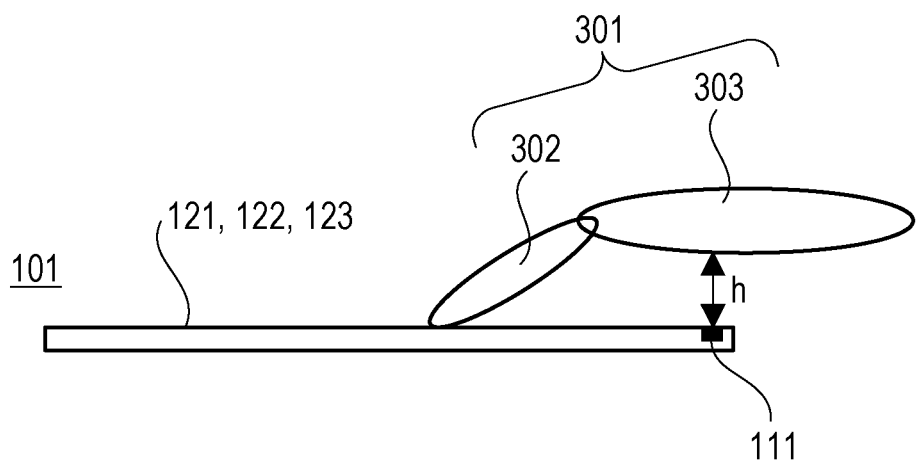
FIG. 7 is a diagram illustrating the distance between the palm and a biometric sensor.

The distance to the palm will be described. FIG. 7 is a diagram illustrating the distance between the palm and the biometric sensor 111.

FIG. 7 is a side view of the terminal apparatus 101 when the terminal apparatus 101 and the user's hand 301 are in the state illustrated in FIG. 5. The terminal apparatus 101 is placed, for example, on a desk. A finger 302 of the user's hand 301 is touching the touch panel 121, and a palm 303 is located above the biometric sensor 111.

In the embodiment, the distance h to the palm 303 is the distance between the biometric sensor 111 and the palm 303.

Next, the relationship between the rotation angle of the palm 303 and the distance to the palm 303 will be described.

Figure 9:
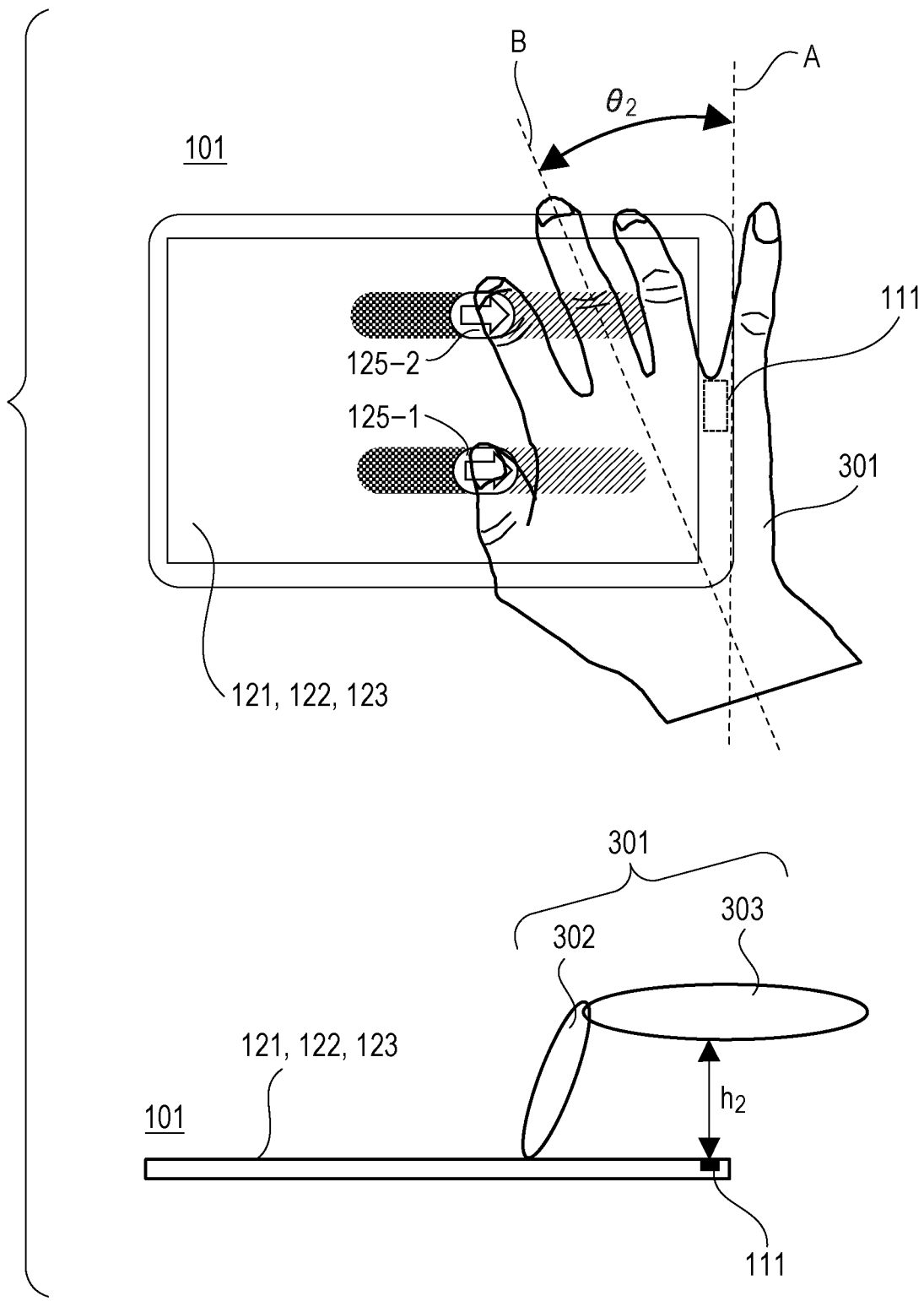
FIG. 9 is a diagram illustrating the relationship between the rotation angle of the palm and the distance to the palm.

FIGS. 8 and 9 are diagrams illustrating the relationship between the rotation angle of the palm 303 and the distance h to the palm 303.

The upper drawings in FIGS. 8 and 9 are plan views of the terminal apparatus 101 in operation, and the lower drawings in FIGS. 8 and 9 are side views of the terminal apparatus 101 in operation.

FIGS. 8 and 9 illustrate how the rotation angle θ of the hand 301 varies depending on the manner in which the hand 301 is placed. FIG. 8 illustrates a case in which the finger 302 is placed on the guide display 125-*i*, with the hand 301 naturally opened. When the user touches the guide displays 125-*i* arrayed in rows with the forefinger and the thumb, the hand 301 tilts obliquely because the forefinger is longer than the thumb. In FIG. 8, the rotation angle of the palm 303 is $\theta_1$, and the distance to the palm 303 is $h_1$.

In contrast, FIG. 9 illustrates a case in which the user touches the guide display 125-*i*, with the finger 302 standing upright. When the user touches the touch panel 121, with the finger 302 standing upright, the base of the finger 302 comes just above the fingertip, so that the bases of the forefinger and the thumb are aligned in the vertical direction. This causes the reference line A of the biometric sensor 111 and the straight line B passing through the center of the width of the middle finger of the hand 301 and the wrist to be substantially parallel to each other (the rotation angle $\theta_2$ to be close to zero degrees). Furthermore, since the finger is in the standing position, the distance $h_2$ to the palm 303 is large. In FIGS. 8 and 9, $\theta_1 > \theta_2$ and $h_1 < h_2$ hold.

For example, the distance h to the palm 303 decreases as the rotation angle θ of the palm 303 increases. For example, the distance h to the palm 303 increases as the rotation angle θ of the palm 303 decreases.

Figure 10:
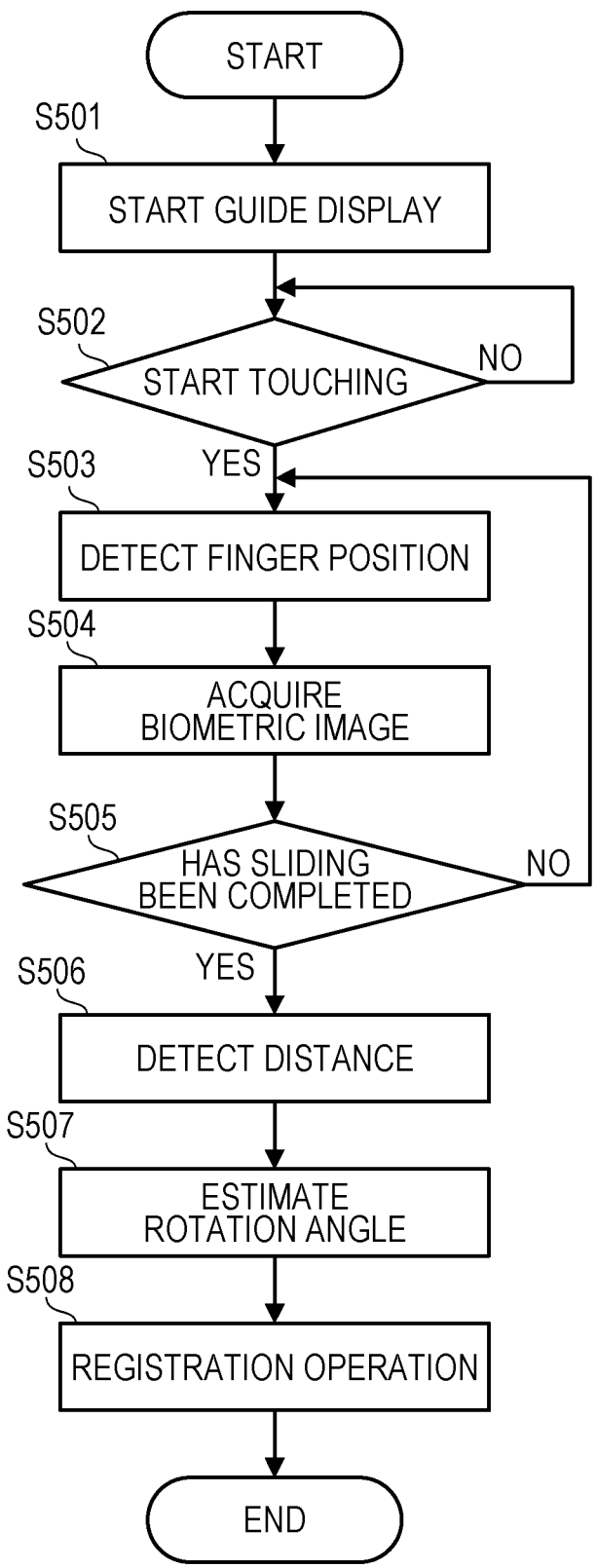
FIG. 10 is a flowchart for registration processing according to an embodiment of the present disclosure.

FIG. 10 is a flowchart for registration processing according to an embodiment of the present disclosure.

In step S501, the display control unit 171 starts guide display. For example, the display control unit 171 displays the guide displays 125-*i* on the display device 122, as illustrated in FIG. 5. The registrant touches the guide displays 125-*i* with the thumb and the forefinger. As illustrated in FIG. 5, at least part of the palm 303 is included in the image-capture area 112 of the biometric sensor 111.

If in step S502 the input device 123 detects the positions (coordinates) of the fingers on the touch panel 121, the control proceeds to step S503.

In the following steps S503 to S505, the registrant moves the thumb and the forefinger in the direction of the arrows along the guide displays 125-*i* from the left end to the right end, with the thumb and the forefinger kept in contact with the guide displays 125-*i*, as illustrated in FIG. 5.

In step S503, the input device 123 detects the positions (coordinates) of the fingers on the touch panel 121 that the registrant touches and outputs the detected positions to the touch-position acquisition unit 141. The touch-position acquisition unit 141 receives the positions of the fingers on the touch panel 121 that the registrant touches from the input device 123.

In step S504, the biometric sensor 111 captures an image of the palm 303 and outputs the captured image (the biometric image) to the biometric-image acquisition unit 131. The biometric-image acquisition unit 131 receives the biometric image from the biometric sensor 111. The biometric-image acquisition unit 131 associates the biometric image with the positions of the fingers detected in step S503.

In step S505, the display control unit 171 determines whether the sliding of the fingers of the registrant has been completed. If the sliding of the fingers of the registrant is completed, the control proceeds to step S506. If the sliding of the fingers of the registrant has not been completed, the control returns to step S503. For example, if the positions of the thumb and the forefinger of the registrant on the touch panel 121 are at the right ends of the guide displays 125-$i$, the display control unit 171 determines that the sliding has been completed.

In steps S502 to S505, a plurality of biometric images corresponding to a plurality of different finger positions on the touch panel 121 are captured.

In step S506, the distance detection unit 151 detects the distance between the biometric sensor 111 and the palm 303 at the time of capturing each of the plurality of biometric images. The distance detection unit 151 calculates the distance between the biometric sensor 111 and the palm 303 at the time of capturing each of the plurality of biometric images, for example, based on the biometric image. For example, the distance detection unit 151 calculates the distance between the biometric sensor 111 and the palm 303 based on the amount of movement of the fingers on the touch panel 121 and the amount of movement of the local feature of the biometric image. The details of a method for calculating the distance between the biometric sensor 111 and the palm 303 is disclosed in, for example, Japanese Laid-open Patent Publication No. 2017-136136.

By calculating the distance using the biometric images, other components, such as a distance sensor, are not added, reducing the cost.

The terminal apparatus 101 may further include a distance sensor and may detect the distance between the distance sensor and the palm 303 when capturing each of the plurality of biometric images. For example, the terminal apparatus 101 includes the distance sensor at the same position as the position of the biometric sensor 111 and uses the distance between the distance sensor and the palm 303 as the distance between the biometric sensor 111 and the palm 303. The use of the distance sensor allows accurate distance detection.

In step S507, the rotation-angle estimation unit 161 estimates the rotation angle $\theta$ of the palm 303 at the time of capturing each of the plurality of biometric images based on the distance h to the palm 303 at the time of capturing each of the plurality of biometric images, detected by the distance detection unit 151. For example, the rotation-angle estimation unit 161 calculates the rotation angle $\theta$ using the following Eqs. (1) to (3).

$$\theta = \theta_{max} \text{ (when } h < h_{min}) \quad (1)$$

$$\theta = ah + b \text{ (when } h_{min} \leq h \leq h_{max}) \quad (2)$$

where coefficient "a" is a negative real number, and constant "b" is a positive real number, $$\theta = 0 \text{ (when } h > h_{max}) \quad (3)$$

where $\theta_{max}$, $h_{min}$, $h_{max}$, coefficient "a", and constant "b" are set in advance.

Figures 11, 12:
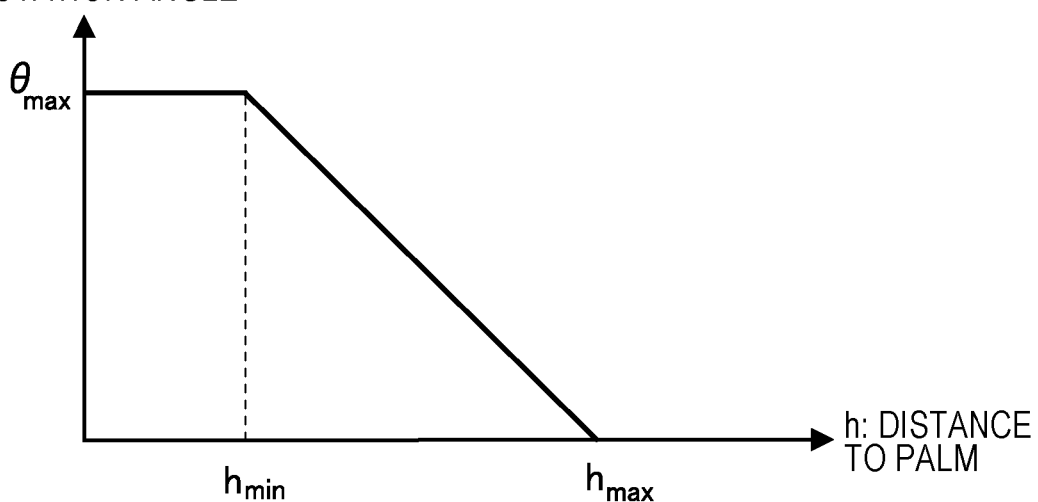
FIG. 11 is a graph illustrating the relationship between the rotation angle of the palm and the distance to the palm.
FIG. 12 is a diagram illustrating an example of a registration DB.

FIG. 11 is a graph illustrating the relationship between the rotation angle $\theta$ of the palm 303 and the distance h to the palm 303. FIG. 11 is a graph of Eqs. (1) to (3). As illustrated in FIG. 11, the rotation angle $\theta$ decreases as the distance h between the sensor and the palm 303 increases.

Referring back to FIG. 10, the description is will be continued.

In step S508, the registration unit 181 performs registration processing. For example, the registration unit 181 extracts a feature from each of the plurality of biometric images. An example of the feature is vein data (a vein pattern) indicating the shape (pattern) of the veins of the palm 303. The registration unit 181 registers the positions and the features of the fingers on the touch panel 121 acquired when each biometric image is captured, and the rotation angle h at the time of capturing the biometric image, obtained from the rotation-angle estimation unit 161, in the registration DB of the storage 201 in association with one another. By registering the rotation angles h of the palm 303 at the time of capturing the biometric images in the registration processing, the difference in the rotation angle of the palm 303 (the relative angle) between the biometric image captured at the registration processing and the biometric image captured at the authentication processing described below can be obtained in the authentication processing. This allows appropriate correction (rotation) of the biometric images.

FIG. 12 illustrates an example of the registration DB.

A registration DB 202 in FIG. 12 is a registration DB of one registrant.

The registration DB 202 stores position $P_j$ (j=1 to n), feature $f_j$, and rotation angle $\theta_j$ in association with one another.

The position $P_j$ is the position (coordinates) of a finger in contact with the touch panel 121 at the time of capturing a biometric image. For example, when the guide displays 125-$i$ as illustrated in FIG. 5 are displayed, the position of at least one of the thumb and the forefinger in contact with the touch panel 121 at the time of capturing a biometric image is stored.

The feature $f_j$ is a feature extracted from the biometric image.

The rotation angle $\theta_j$ is the rotation angle of the palm 303 at the time of capturing the biometric image.

The terminal apparatus 101 may store a registration DB corresponding to each of a plurality of registrants. The terminal apparatus 101 may store a plurality of registration DBs to perform 1-to-N authentication.

In step S508, the registration unit 181 may correct (rotate) each of the plurality of biometric images based on each of the rotation angles $\theta$ of the plurality of biometric images, calculated by the rotation-angle estimation unit 161, and may extract a feature from each of the corrected plurality of biometric images. For example, if the rotation angle of a certain biometric image at the time of image capturing is $\theta$, the registration unit 181 may rotate the biometric image through $-\theta$ and may extract a feature from the rotated biometric image. At that time, the registration unit 181 may register the position $P_j$ and the feature $f_j$ extracted from the rotated biometric image in the registration DB 202 but may not register the rotation angle $\theta_j$. For example, the registration unit 181 may extract the feature from the biometric image whose rotation angle is corrected to zero degrees in advance at registration.

Figure 13:
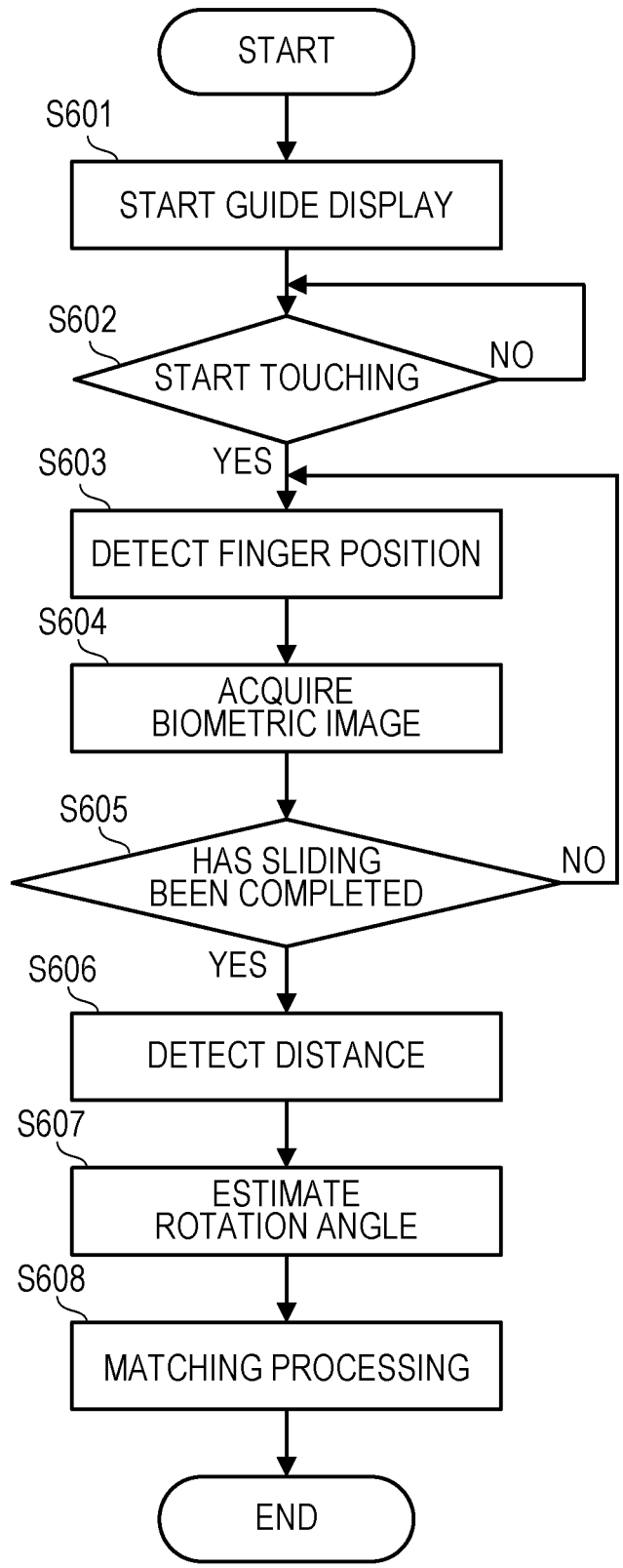
FIG. 13 is a flowchart for authentication processing according to an embodiment of the present disclosure.

FIG. 13 is a flowchart for authentication processing according to an embodiment of the present disclosure.

In step S601, the display control unit 171 starts guide display. For example, the display control unit 171 displays the guide displays 125-$i$ on the display device 122, as illustrated in FIG. 5. The authentication target touches the guide displays 125-$i$ with the thumb and the forefinger. As illustrated in FIG. 5, at least part of the palm 303 is included in the image-capture area 112 of the biometric sensor 111.

If in step S602 the input device 123 detects the positions (coordinates) of the fingers on the touch panel 121, the control proceeds to step S603.

In the following steps S603 to S605, the authentication target moves the thumb and the forefinger in the direction of the arrows along the guide displays 125-$i$ from the left end to the right end, with the thumb and the forefinger kept in contact with the guide displays 125-*i*, as illustrated in FIG. 5.

In step S603, the input device 123 detects the positions (coordinates) of the fingers on the touch panel 121 that the authentication target touches and outputs the detected positions to the touch-position acquisition unit 141. The touch-position acquisition unit 141 receives the positions of the fingers on the touch panel 121 that the authentication target touches from the input device 123.

In step S604, the biometric sensor 111 captures an image of the palm 303 and outputs the captured image (the biometric image) to the biometric-image acquisition unit 131. The biometric-image acquisition unit 131 receives the biometric image from the biometric sensor 111. The biometric-image acquisition unit 131 associates the biometric image with the positions of the fingers detected in step S603.

In step S605, the display control unit 171 determines whether the sliding of the fingers of the authentication target has been completed. If the sliding of the fingers of the authentication target is completed, the control proceeds to step S606. If the sliding of the fingers of the authentication target has not been completed, the control returns to step S603. For example, if the positions of the thumb and the forefinger of the authentication target on the touch panel 121 are at the right ends of the guide displays 125-*i*, the display control unit 171 determines that the sliding has been completed.

In steps S602 to S605, a plurality of biometric images corresponding to a plurality of different finger positions on the touch panel 121 are captured.

In step S606, the distance detection unit 151 detects the distance between the biometric sensor 111 and the palm 303 at the time of capturing each of the plurality of biometric images. The distance detection unit 151 calculates the distance between the biometric sensor 111 and the palm 303 at the time of capturing each of the plurality of biometric images, for example, based on the biometric image. For example, the distance detection unit 151 calculates the distance between the biometric sensor 111 and the palm 303 based on the amount of movement of the fingers on the touch panel 121 and the amount of movement of the local feature of the biometric image. The details of a method for calculating the distance between the biometric sensor 111 and the palm 303 is disclosed in, for example, Japanese Laid-open Patent Publication No. 2017-136136.

By calculating the distance using the biometric images, other components, such as a distance sensor, are not added, reducing the cost.

The terminal apparatus 101 may further include a distance sensor and may detect the distance between the distance sensor and the palm 303 when capturing each of the plurality of biometric images. For example, the terminal apparatus 101 includes the distance sensor at the same position as the position of the biometric sensor 111 and uses the distance between the distance sensor and the palm 303 as the distance between the biometric sensor 111 and the palm 303. The use of the distance sensor allows accurate distance detection.

In step S607, the rotation-angle estimation unit 161 estimates the rotation angle $\theta$ of the palm 303 at the time of capturing each of the plurality of biometric images based on the distance h to the palm 303 at the time of capturing each of the plurality of biometric images, detected by the distance detection unit 151. For example, the rotation-angle estimation unit 161 calculates the rotation angle $\theta$ using the following Eqs. (1) to (3).

$$\theta = \theta_{max} (\text{when } h < h_{min}) \quad (1)$$

$$\theta = ah + b (\text{when } h_{min} \leq h \leq h_{max}) \quad (2)$$

where coefficient "a" is a negative real number, and constant "b" is a positive real number $$\theta = 0 (\text{when } h > h_{max}) \quad (3)$$

where $\theta_{max}$, $h_{min}$, $h_{max}$, coefficient "a", and constant "b" are set in advance.

In step S608, the matching unit 191 performs matching processing using the biometric image captured in step S604 and the registration DB 202.

Here, a case in which the matching unit 191 performs matching processing using one of a plurality of biometric images as an image to be checked will be described.

Assume that $P_A$ is the position of the finger on the touch panel 121 at the time of capturing the biometric image to be checked, and $\theta_A$ is the rotation angle at the time of capturing the biometric image.

The matching unit 191 detects a position $P_B$ that is the same as or closest to the position $P_A$ from the registration DB 202. Assume that $f_B$ is a feature corresponding to the position $P_B$ in the registration DB 202, and $\theta_B$ is the rotation angle. The matching unit 191 calculates the difference (the relative angle) $\theta_d$ between the rotation angle $\theta_A$ and the rotation angle $\theta_B$. The matching unit 191 rotates the biometric image to be checked through the relative angle $\theta_d$. The matching unit 191 extracts a feature $f_A$ from the rotated biometric image.

The matching unit 191 calculate the similarity between the feature $f_A$ and the feature $f_B$ and determines whether the authentication is successful based on the calculated similarity. If the matching is successful, the matching unit 191 authenticates the authentication target and performs predetermined processing such as unlocking of the terminal apparatus 101.

The matching unit 191 may perform matching processing using all of the plurality of biometric images or part of the plurality of biometric images. For example, the matching unit 191 may perform matching processing using one biometric image, described above, for each of the plurality of biometric images and may determine whether authentication is successful based on the plurality of similarities calculated.

If the rotation angle has been corrected to zero degrees, and the rotation angle $\theta_B$ is not registered in the registration DB at registration processing, the matching unit 191 calculates the relative angle $\theta_d$ using the rotation angle $\theta_B = 0$.

To cope with personal differences in hand size, the display control unit 171 may display one of a plurality of kinds of guide display in which the interval between the two guide displays differs. In this case, the difference in the interval between the two guide displays causes the relationship between the height and the rotation angle to differ. For this reason, the correspondence relationship between the distance to the palm and the rotation angle may be obtained for each guide display in advance, and is used in estimating the rotation angle.

Figure 14:
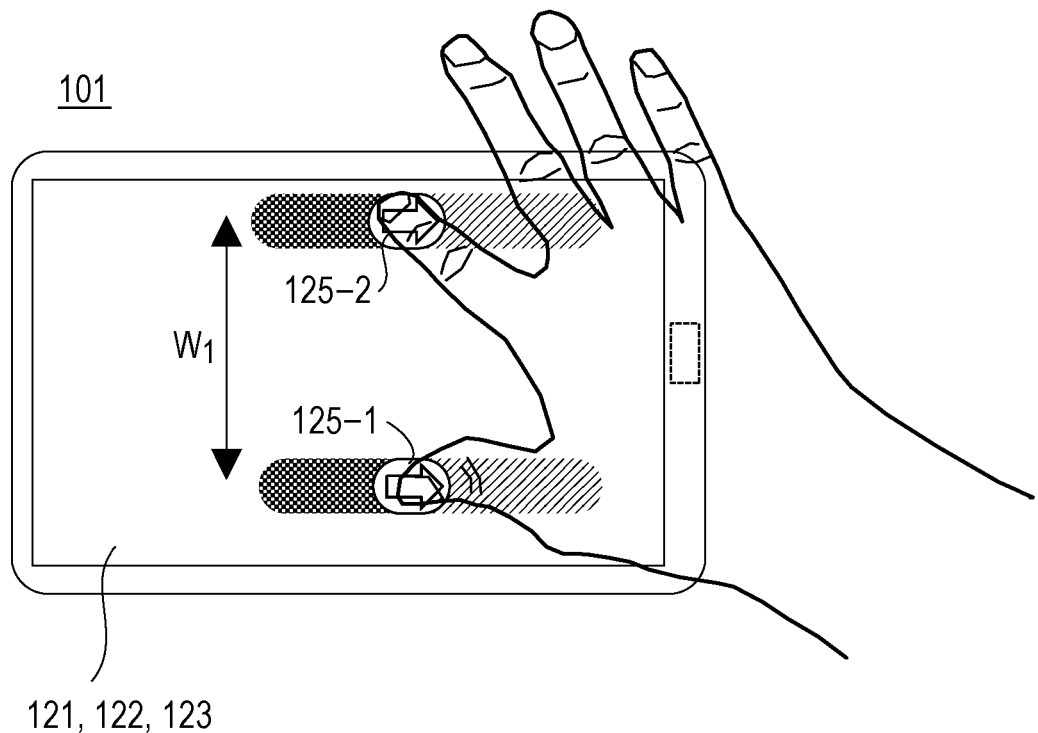
FIG. 14 is a diagram illustrating an example of a guide display according to an embodiment of the present disclosure.
Figure 15:
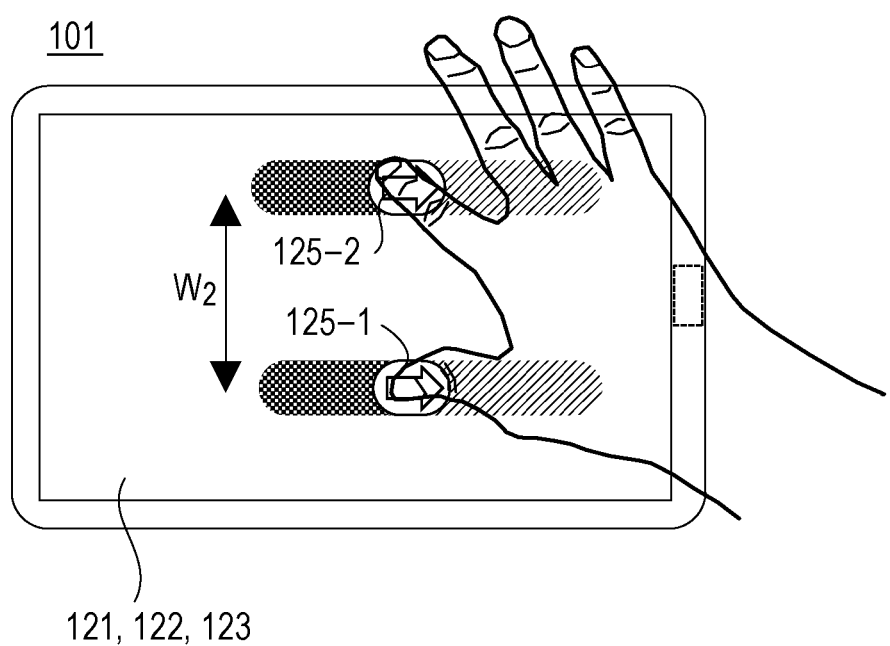
FIG. 15 is a diagram illustrating an example of a guide display according to an embodiment of the present disclosure.

FIGS. 14 and 15 illustrate examples of the guide display. In FIG. 14, W1 is the interval between the guide display 125-1 and the guide display 125-2. In FIG. 15, W2 is the interval between the guide display 125-1 and the guide display 125-2. The interval W1 is larger than the interval W2.

$\theta_{max}$, $h_{min}$, $h_{max}$, coefficient a, constant b, corresponding to a first guide display in which the interval is W1 and $\theta_{max}$, $h_{min}$, $h_{max}$, coefficient a, constant b corresponding to a second guide display in which the interval is W2 are set in advance in the terminal apparatus 101. For example, the terminal apparatus 101 may store, in advance, thresholds, coefficients, and constants corresponding to each guide display and for use in calculating the rotation angle.

Which guide display is to be used may be set in the terminal apparatus 101 by the user. For example, in step S601, the display control unit 171 displays the set guide display among a plurality of guide displays in which the interval between two guide displays differs.

The display control unit 171 reports the set guide display to the rotation-angle estimation unit 161, and in step S507 or step S607, the rotation-angle estimation unit 161 estimates the rotation angle θ using $θ_{ax}$, $h_{min}$, $h_{max}$, coefficient a, and constant b corresponding to the reported guide display. Since a plurality of kinds of guide display can be displayed, individual differences in hand size can be coped with. The two guide displays are given for mere illustrative purposes, and the terminal apparatus 101 may display three or more kinds of guide display.

The terminal apparatus 101 of the present embodiment is capable of obtaining a biometric image corresponding to an image captured at the same rotation angle of the hand as the registered rotation angle by rotating the biometric image to be checked with the difference (relative angle) between the rotation angle of the hand at the time of registration and the rotation angle at authentication. This increases the authentication accuracy in biometric authentication using a biometric image.

The terminal apparatus 101 of the embodiment may reduce a false rejection due to an angular change and the risk of a false acceptance.

FIG. 16 is a block diagram of an information processing apparatus (computer).

The terminal apparatus 101 of the embodiment is implemented by, for example, the information processing apparatus (computer) 1 as illustrated in FIG. 16.

The information processing apparatus (computer) 1 includes a central processing unit (CPU) 2, a memory 3, a storage unit 4, a touch panel 5, a biometric sensor 6, and a storage-medium driving unit 7, which are connected to each other by a bus 9.

The CPU 2 is a central processing unit (processor) that controls the entire information processing apparatus 1. The CPU 2 operates as the biometric-image acquisition unit 131, the touch-position acquisition unit 141, the distance detection unit 151, the rotation-angle estimation unit 161, the display control unit 171, the registration unit 181, and the matching unit 191.

An example of the memory 3 is a random access memory (RAM) that temporarily stores programs or data stored in the storage unit 4 (or a portable storage medium 10). The CPU 2 executes the various processes described above by executing the programs using the memory 3.

Examples of the storage unit 4 include a magnetic disk and a non-volatile memory. The information processing apparatus 1 stores the above programs and data in the storage unit 4 and reads the programs and data into the memory 3 for use. The storage unit 4 corresponds to the storage 201.

The touch panel 5 has a function of displaying information and a function of detecting contact of a finger or the like with the touch panel 121. The touch panel 5 includes a display device 11 and an input device 12. The touch panel 5 corresponds to the touch panel 121.

The display device 11 displays sentences, drawings, and a guide display indicating a finger touch position. The display device 11 corresponds to the display device 122.

The input device 12 detects the position (coordinates) of the finger on the touch panel 5 that the user touches and outputs the detected position to the CPU 2. The input device 12 corresponds to the input device 123.

The biometric sensor 6 captures an image of a living body, such as a palm, of the user (registrant or an authentication target). An example of the biometric sensor 6 is an infrared camera. The biometric sensor 6 corresponds to the biometric sensor 111.

The storage-medium driving unit 7 drives the portable storage medium 10 and accesses the memory content. Examples of the portable storage medium 10 include a memory card, a flexible disk, a compact disc read-only memory (CD-ROM), an optical disc, a magneto-optical disc, and any other computer-readable storage media. The user stores the above programs and data in the portable storage medium 10 and reads the programs and data into the memory 3 for use.

The information processing apparatus 1 may not include all of the components in FIG. 16. Some of the components may be omitted according to usage and conditions. For example, in the case where the information processing apparatus 1 does not access the portable storage medium 10, the storage-medium driving unit 7 may be omitted. The information processing apparatus 1 may include other components according to usage and conditions. For example, in the case where the information processing apparatus 1 has a communication function, a communication unit that transmits and receives data may be added.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biometric-image processing apparatus comprising:
    a touch panel;
    a memory;
    an image-capturing device configured to capture an image of a living body when a part of the living body is in contact with the touch panel to obtain a biometric image; and
    a processor coupled to the memory and configured to execute a process including:
    calculating a distance between the image-capturing device and the living body, and
    estimating a rotation angle, in a plane parallel to the touch panel, of the living body to the image-capturing device based on the calculated distance and a correspondence relationship between the distance and the rotation angle obtained in advance.

2. The biometric-image processing apparatus according to claim 1, wherein the distance is calculated by using the biometric image.

3. The biometric-image processing apparatus according to claim 1, wherein the process further including:
    correcting the biometric image captured by the image-capturing device based on the rotation angle.

4. The biometric-image processing apparatus according to claim 1, wherein the process further including:

registering a feature extracted from the biometric image and the rotation angle in a database in association with each other.

5. A biometric-image processing method performed by a computer comprising an image-capturing device and a touch panel, the method including:
- capturing an image of a living body when a part of the living body is in contact with the touch panel by the image-capturing device;
- calculating a distance between the image-capturing device and the living body, and
- estimating a rotation angle, in a plane parallel to the touch panel, of the living body to the image-capturing device based on the calculated distance and a correspondence relationship between the distance and the rotation angle obtained in advance.

6. The biometric-image processing method according to claim 5, wherein the distance is calculated by using the biometric image.

7. The biometric-image processing method according to claim 5, wherein the method further including:
- correcting the biometric image captured by the image-capturing device based on the rotation angle.

8. The biometric-image processing method according to claim 5, wherein the method further including:
- registering a feature extracted from the biometric image and the rotation angle in a database in association with each other.

9. A non-transitory computer-readable storage medium having stored a biometric-image processing program for causing a computer comprising an image-capturing device and a touch panel to perform a process including;
- capturing an image of a living body when a part of the living body is in contact with the touch panel by the image-capturing device;
- calculating a distance between the image-capturing device and the living body, and
- estimating a rotation angle, in a plane parallel to the touch panel, of the living body to the image-capturing device based on the calculated distance and a correspondence relationship between the distance and the rotation angle obtained in advance.

10. The storage medium according to claim 9, wherein the distance is calculated by using the biometric image.

11. The storage medium according to claim 9, wherein the process further including:
- correcting the biometric image captured by the image-capturing device based on the rotation angle.

12. The storage medium according to claim 9, wherein the process further including:
- registering a feature extracted from the biometric image and the rotation angle in a database in association with each other.

* * * * *